US011770583B1

(12) United States Patent
Jeng et al.

(10) Patent No.: US 11,770,583 B1
(45) Date of Patent: Sep. 26, 2023

(54) HDMI DEVICE AND POWER-SAVING METHOD FOR IMMEDIATELY SWITCHING HDMI PORTS

(71) Applicant: MEDIATEK INC., Hsinchu (TW)

(72) Inventors: You-Tsai Jeng, Hsinchu (TW); Chia-Hao Chang, Hsinchu (TW); Yi-Cheng Chen, Hsinchu (TW); Kai-Wen Yeh, Hsinchu (TW); Kuo-Chang Cheng, Hsinchu (TW); Chi-Chih Chen, Hsinchu (TW); Szu-Hsiang Lai, Hsinchu (TW); Chin-Lung Lin, Hsinchu (TW); Kai-Wen Cheng, Hsinchu (TW); Te-Chuan Wang, Hsinchu (TW); Ko-Yin Lai, Hsinchu (TW); Keng-Lon Lei, Hsinchu (TW); Tai-Lai Tung, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/814,024

(22) Filed: Jul. 21, 2022

(51) Int. Cl.
*H04N 5/63* (2006.01)
*H04N 21/436* (2011.01)
*H04N 21/4363* (2011.01)

(52) U.S. Cl.
CPC ......... *H04N 21/43635* (2013.01); *H04N 5/63* (2013.01)

(58) Field of Classification Search
CPC .. H04N 5/63; H04N 5/04; H04N 5/06; H04N 21/43635
USPC .................................. 348/180, 188, 500, 730
See application file for complete search history.

(56) References Cited

U.S. PATENT DOCUMENTS

| 8,390,743 | B2 | 3/2013 | Cheng et al. |
| 10,452,218 | B2 | 10/2019 | Yamamoto et al. |
| 10,785,386 | B1* | 9/2020 | Chuang ............ H04N 21/43635 |
| 11,223,749 | B1* | 1/2022 | Lin ......................... H04N 5/06 |
| 2012/0229653 | A1* | 9/2012 | Lien ...................... H04N 17/004 |
| | | | 348/192 |

(Continued)

FOREIGN PATENT DOCUMENTS

| TW | 201308986 A | 2/2013 |
| TW | 201349839 A | 12/2013 |

(Continued)

OTHER PUBLICATIONS

Chinese language office action dated Jul. 11, 2022, issued in application No. TW 110145413.

(Continued)

*Primary Examiner* — Sherrie Hsia
(74) *Attorney, Agent, or Firm* — McClure, Qualey & Rodack, LLP

(57) ABSTRACT

A power-saving method for an HDMI device is provided. The method includes detecting color depth information of video data from an HDMI source which is connected to the HDMI port, deriving a horizontal length for each line by fragment of a picture frame according to the color depth information, generating a plurality of synchronization signals according to the horizontal length for each line by fragment, and powering on the HDMI port, according to the synchronization signals, for a predetermined time period to obtain encrypted information from the HDMI source, and powering off the HDMI port after the predetermined time period.

16 Claims, 8 Drawing Sheets

(56) References Cited

U.S. PATENT DOCUMENTS

2020/0313883 A1   10/2020   Huang et al.

FOREIGN PATENT DOCUMENTS

TW     201614626 A    4/2016
TW     202037183 A    10/2020

OTHER PUBLICATIONS

Chinese language office action dated Jan. 31, 2023, issued in application No. TW 111138670.

* cited by examiner

HDMI DEVICE AND POWER-SAVING METHOD FOR IMMEDIATELY SWITCHING HDMI PORTS

BACKGROUND OF THE INVENTION

Field of the Invention

The invention generally relates to an audio and video transmitting technology, and more particularly, to power-saving aspects of High-Definition Multimedia Interface (HDMI) technology.

Description of the Related Art

High-Definition Multimedia Interface (HDMI) is a licensable audio/video connector interface for transmitting encrypted digital streams that may be uncompressed or compressed. Video and Audio data provided by various DRM-enforcing digital audio/video source devices (such as a set-top box, a HD DVD Disc player, a Blu-ray Disc player, a Personal Computer, a videogame console, or an AV receiver) can be transmitted to compatible HDMI sink devices (such as a digital television (DTV)) via an HDMI digital interface. The HDMI standard was initially introduced in 2006 on consumer HDTV camcorders and high-end digital still cameras, representing the DRM (Digital rights management) alternative to consumer analog standards such as RF (coaxial cable), composite video, S-Video, SCART, component video, and VGA, as well as digital standards such as DVI (DVI-D and DVI-I).

HDCP (High-bandwidth Digital Content Protection) is a standard for protecting digital content over certain interfaces. The interfaces may, for example, be between a set-top box (STB) (for transmitting audio and video over the HDMI interface) and a television (which receives HDMI). Protection is accomplished by encrypting the data before it leaves the transmitter. A legitimate receiver then decrypts the data.

In the current HDMI technology, a fast switch function between HDMI ports is required.

However, when the user switches from one HDMI port to another, the HDMI device and the source are required to perform some synchronization operations first, because of the HDCP encryption. Therefore, when the user switches from one HDMI port to another, the user may need to wait a bit to see the video displayed on the electronic device corresponding to the other HDMI port. Furthermore, although all of the HDMI ports that are turned on can synchronize all the HDMI lane signals in advance in order to reduce the wait time, the high power consumption will still be an issue. Also, how to immediately switch from one HDMI port to another has become a problem in the art that needs to be solved.

BRIEF SUMMARY OF THE INVENTION

A power-saving method for immediately switching High Definition Multimedia Interface (HDMI) ports and an HDMI device are provided to overcome the problems mentioned above.

An embodiment of the invention provides a power-saving method. The HDMI device has an HDMI port being disabled for displaying. The method includes: detecting color depth information of video data from an HDMI source which is connected to the HDMI port; deriving a horizontal length for each line by fragment of a picture frame according to the color depth information; generating a plurality of synchronization signals according to the horizontal length for each line by fragment; and powering on the HDMI port, according to the synchronization signals, for a predetermined time period to obtain encrypted information from the HDMI source, and powering off the HDMI port after the predetermined time period.

An embodiment of the invention provides a High Definition Multimedia Interface (HDMI) device. The HDMI device includes an HDMI interface, a second HDMI port, and an HDMI synchronization signal generator. The HDMI interface includes a plurality of HDMI ports. The HDMI ports include a first HDMI port and a second HDMI port. The first HDMI port is initially enabled for displaying. The second HDMI port is disabled for displaying. The HDMI synchronization signal generator is coupled to the HDMI interface. The HDMI synchronization signal generator provides a synchronization signal according to data from an HDMI source coupled to the second HDMI port.

Other aspects and features of the invention will become apparent to those with ordinary skill in the art upon review of the following descriptions of specific embodiments of the HDMI device and the power-saving method for immediately switching HDMI ports.

The power-saving method for switching HDMI ports on an HDMI device and the HDMI device of the invention provides a mechanism to immediately switch ports. In power-saving mode, the HDMI synchronization signal generator calculates and transmits the virtual fragment domains and generates enable data to the backend, so that the backend regards it operates in the normal power mode, so as to achieve fast switching between the power-saving mode and the normal power mode. Therefore, the power-saving mode can be implemented, and power consumption can be reduced. Furthermore, when the user switches from one HDMI port to another, the user can immediately see the video data without having to wait for re-authentication.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
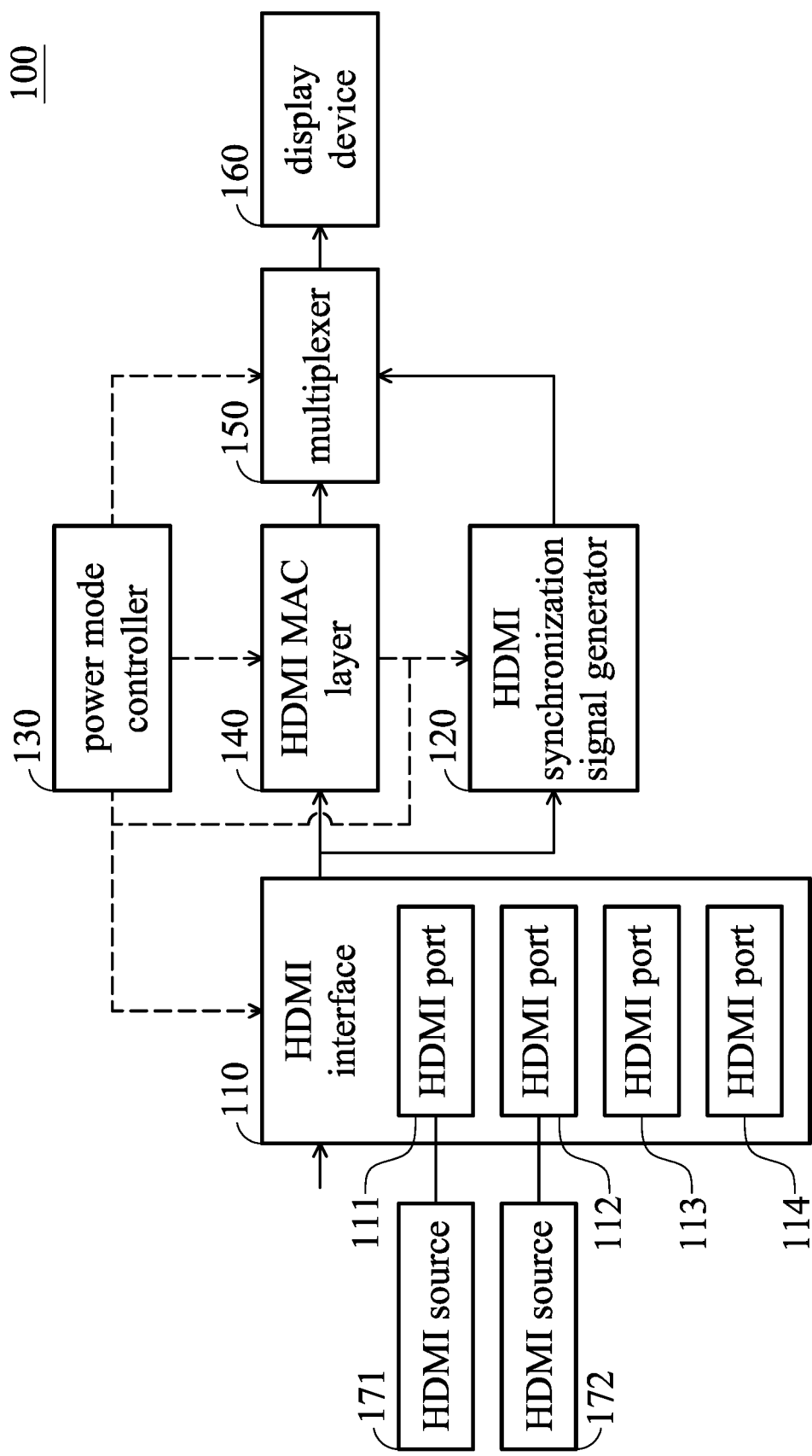
FIG. 1 is a block diagram of a High Definition Multimedia Interface (HDMI) device 100 according to an embodiment of the invention.

FIG. 1 is a block diagram of a High Definition Multimedia Interface (HDMI) device 100 according to an embodiment of the invention. In the embodiments of the invention, the HDMI device 100 can be regarded as a sink device which can support the high bandwidth digital content protection (HDCP) technology, e.g., a television, a repeater or a displaying device, but the invention should not limit thereto.

As shown in FIG. 1, the HDMI device 100 comprises an HDMI interface 110, an HDMI synchronization signal generator 120, and a power mode controller 130. In one embodiment, the HDMI device 100 comprises an HDMI interface 110, an HDMI synchronization signal generator 120, and a power mode controller 130, an HDMI media access control (MAC) layer 140, and multiplexer 150. In one embodiment, the HDMI device 100 comprises an HDMI interface 110, an HDMI synchronization signal generator 120, and a power mode controller 130, an HDMI MAC layer 140, and multiplexer 150, and a display device 160.

The HDMI interface 110 comprises a plurality of HDMI ports (e.g., a first HDMI port 111, a second HDMI port 112, a third HDMI port 113 and a fourth HDMI port 114, but the invention should not be limited thereto). For example, the first HDMI port 111 is initially enabled for displaying; and the second HDMI port 112, the third HDMI port 113, and the fourth HDMI port 114 are disabled for displaying. Each HDMI port can be switched to normal power mode (enable mode) or power-saving mode by the power mode controller 130.

It should be noted that, in order to clarify the concept of the invention, FIG. 1 is a simplified block diagram in which only the elements relevant to the invention are shown. However, the invention should not be limited to what is shown in FIG. 1.

In one embodiment, the HDMI synchronization signal generator 120 is coupled to the HDMI interface 110. The power mode controller 130 is respectively coupled to the HDMI interface 110, the HDMI MAC layer 140, a multiplexer 150, and the HDMI synchronization signal generator 120. The multiplexer 150 is coupled to the display device 160. The HDMI interface 110 is coupled to the HDMI synchronization signal generator 120 and the HDMI MAC layer 140. The HDMI synchronization signal generator 120 and the HDMI MAC layer 140 are respectively coupled to the multiplexer 150.

In the normal color mode, the color depth is 24 bits per pixel. 8 bits can be processed in a TMDS clock in each of three channels of the HDMI ports. However, in the deep color mode, the color depth could be 30 bits, 36 bits or 48 bits per pixel so that the "deep color pixel packing" has to be applied. All pixel data are grouped into a series of packed pixel group, each carrying same number of pixels and each requiring same number of TMDS clock for transmission. One each TMDS clock, one fragment of the pixel group is transmitted. The number of pixels per group and number of fragments per group depends on the pixel size. For the 30-bit deep color mode, the relationship of the pixel, the fragment and the group is four pixels per group and five fragments per group. For the 36-bit deep color mode, it is two pixels per group and three fragments per group. For the 48-bit deep color mode, it is one pixel per group and two fragments per group. When the deep color mode is applied, the signaling, such as horizontal synchronization signal (HSYNC), vertical synchronization signal (VSYNC) and data enable (DE) transitions, would be grouped into fragments as well.

Figure 2:
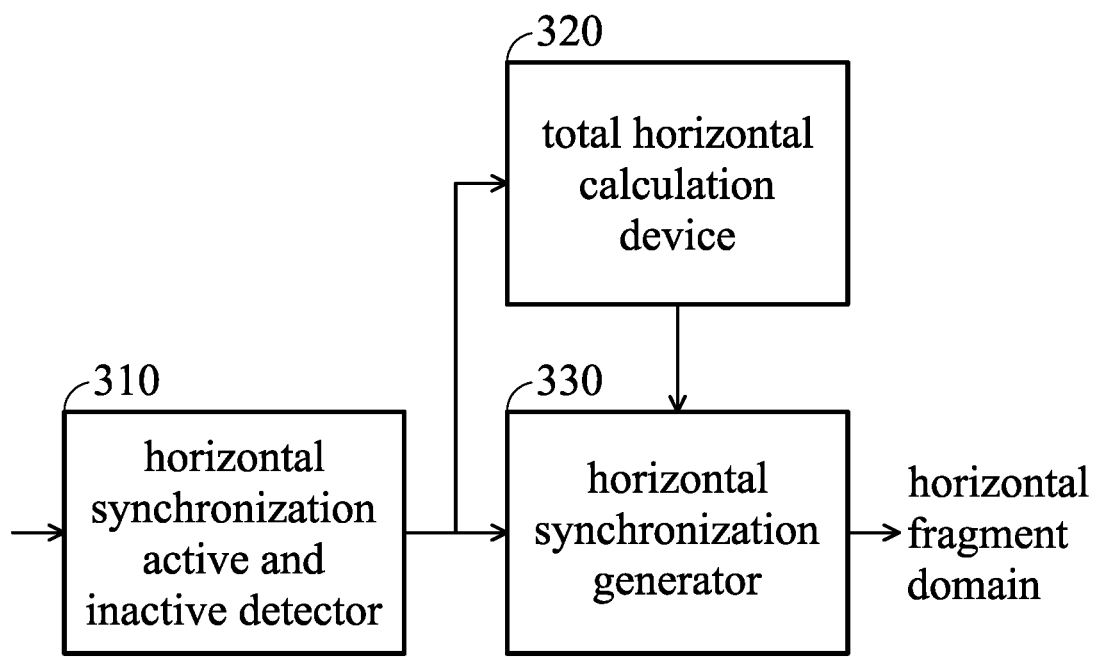
FIG. 2 is a block diagram of the HDMI synchronization signal generator 120 according to an embodiment of the invention.

FIG. 2 is a block diagram of the HDMI synchronization signal generator 120 according to an embodiment of the invention.

In one embodiment, the HDMI synchronization signal generator 120 includes a horizontal synchronization active and inactive detector 310, a total horizontal calculation device 320 and a horizontal synchronization generator 330. These components can be implemented by hardware, such as circuit, chip and/or device.

In one embodiment, the horizontal synchronization active and inactive detector 310 detects HDMI synchronization active timings and corresponding HDMI synchronization inactive timings and transmits the HDMI synchronization active timings and the corresponding HDMI synchronization inactive timings to the total horizontal calculation device 320.

In one embodiment, the total horizontal calculation device 320 is coupled to the horizontal synchronization active and inactive detector 310. The total horizontal calculation device 320 receives the HDMI synchronization active timings for N times (for example, there are 4 HDMI synchronization active timings for 4 horizontal lines being calculated) and the corresponding HDMI synchronization inactive timings for N times (for example, there are 4 HDMI synchronization inactive timings respectively corresponding to 4 HDMI synchronization active timings for 4 horizontal lines being calculated). The total horizontal calculation device 320 obtains the number of pixels of a horizontal line in a picture frame, h_total_for_1_line, by calculating and summing a number of fragments per line for N lines and dividing each value by a deep color reference number. The variable "N" and the deep color reference mentioned above are various according to the color depth of the pixel. For example, the variable "N" is 4 and the deep color reference number is 5 for 30-bit deep color mode, the variable "N" is 2 and the deep color reference number is 3 for 36-bit deep color mode; and the variable "N" is 1 and the deep color reference number is 2 for 48-bit deep color mode.

Figure 3:
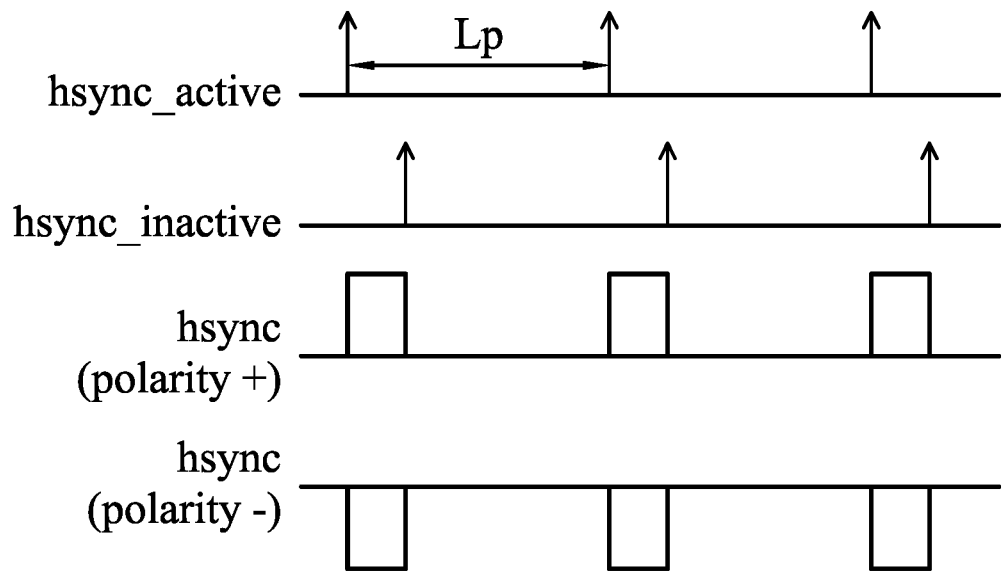
FIG. 3 is a schematic diagram of generating HDMI synchronization signal according to an embodiment of the invention.

FIG. 3 is a schematic diagram of generating HDMI synchronization signal according to an embodiment of the invention. In FIG. 3, the length between two adjacent horizontal synchronization active timings indicates the horizontal length, $L_p$, for a horizontal line of the picture frame.

$L_p$ indicates the number of fragments to be transmitted for each horizontal line. However, since the deep color pixel packing is applied, the horizontal length, $L_p$, may be different line by line in the picture frame.

In one embodiment, the horizontal synchronization generator 330 is coupled to the horizontal synchronization active and inactive detector 310 and the total horizontal calculation device 320. The horizontal synchronization generator 330 receives an initial HDMI synchronization active timing from the horizontal synchronization active and inactive detector 310 and the horizontal length, $L_p$, from the total horizontal calculation device 320, and generates a virtual HSYNC in fragment domain of the second HDMI port according to the initial HDMI synchronization active timing and the horizontal length, $L_p$.

In one embodiment, when 30-bit deep color mode is applied, 10 bits data for each channel of the second HDMI port would be processed for each pixel. The total horizontal calculation device 320 calculates the number of pixels of a horizontal line in a picture frame, h_total_for_1_line, by the equation:

$$h_{total\ for\ 1\ line} = N_{fragments\ for\ 4\ lines} / 5$$

$N_{fragments\ for\ 4\ lines}$ indicates the number of fragments to be transmitted for four horizontal lines in the picture frame.

Subsequently, the number of pixels of a horizontal line in the picture frame, h_total_for_1_line, can be presented as 4k+i. The notation k is a positive integer, the notation i is the remainder positive integer between 0 and 3. For example, if there are 1875 pixels in one horizontal line. h_total_for_1_line=4k+i, wherein k=468 and i=3.

With the value of "k" and "i", the horizontal length, $L_p$, for each line (as shown in FIG. 3) can be calculated by the follow equation:

$$L_p = 5k + \left\lfloor \frac{5}{4} i \cdot p \right\rfloor - \left\lfloor \frac{5}{4} i \cdot (p-1) \right\rfloor$$

The notation $L_p$ can represent the horizontal length by fragment. That is, $L_p$ indicates the number of fragments of each horizontal line in the picture frame. To be clear, the number of fragments could be different for each line in the picture frame. The notation p indicates the index of line. According to the values of k and i, which are derived from the number of pixels of a horizontal line in the picture frame, and the floor function equation, the horizontal length by fragment can be obtained. Taking 1875 pixels in one horizontal line for example, the value of k is 468 and the value of i is 3. The number of fragment of the first line, $L_1$ is 5*468+[5/4*3*1]−[5/4*3*(1−1)]=5*468+3. The number of fragment of the second line, $L_2$ is 5*468+[5/4*3*2]−[5/4*3*(2−1)]=5*468+4. The number of fragment of the n-th line, $L_n$ is 5*468+[5/4*3*n]−[5/4*3*(n−1)]. Accordingly, the number of fragments of each line of the picture frame can be obtained.

According to the initial HDMI synchronization active timing and the horizontal length $L_p$, the subsequent synchronization active timings can be predicted, and the virtual HSYNC can be generated.

FIG. 3 is a schematic diagram of generating HDMI synchronization signal according to an embodiment of the invention. In FIG. 3, hsync_active means HDMI synchronization active timing, and hsync_inactive means HDMI synchronization inactive timing. According to the HDMI synchronization active timing and HDMI synchronization inactive timing, the horizontal synchronization generator 330 generates synchronization signal hsync with positive polarity (polarity +) and synchronization signal hsync with negative polarity (polarity −).

Figure 4:
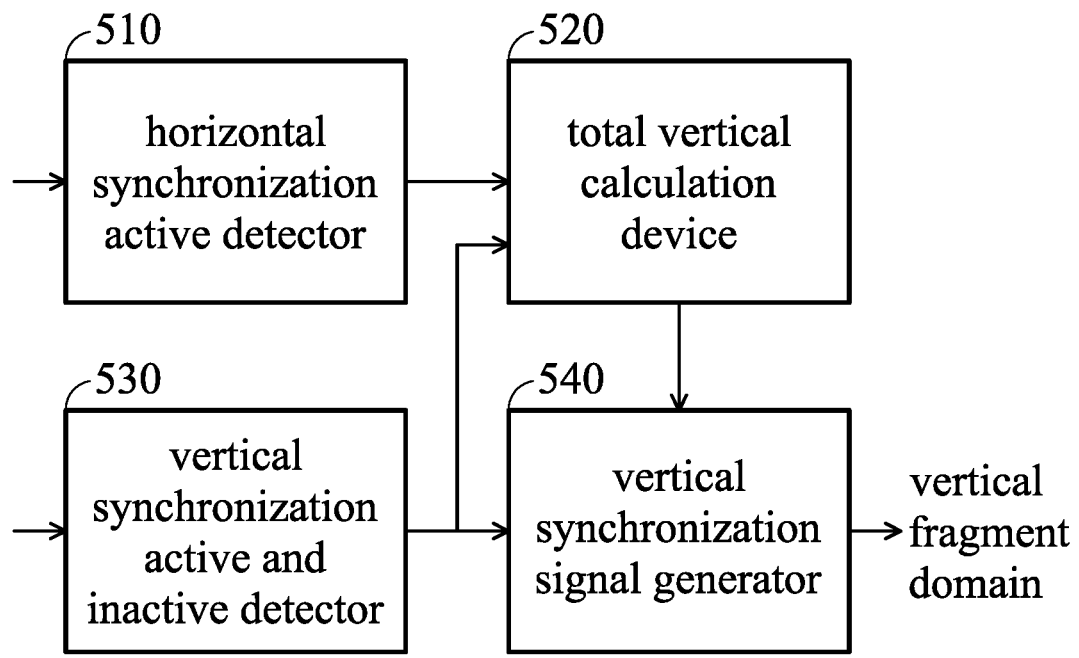
FIG. 4 is a block diagram of the HDMI synchronization signal generator 120 according to an embodiment of the invention.

FIG. 4 is a block diagram of the HDMI synchronization signal generator 120 according to an embodiment of the invention. In one embodiment, the HDMI synchronization signal generator 120 includes a horizontal synchronization active detector 510, a total vertical calculation device 520, a vertical synchronization active and inactive detector 530 and a vertical synchronization signal generator 540. These components can be implemented by hardware, such as circuit, chip and/or device.

In one embodiment, the horizontal synchronization active detector 510 is configured to detect HSYNC signal of each horizontal line in the picture frame. The total vertical calculation device 520 is coupled to the horizontal synchronization active detector 510. The total vertical calculation device 520 counts the number of horizontal lines in the picture frame by counting the HSYNC signals between two adjacent rising edges of VSYNC signals. The vertical synchronization active and inactive detector 530 is coupled to the total vertical calculation device 520. The vertical synchronization active and inactive detector 530 detects a plurality of rising edges of the VSYNC signals or a plurality of falling edges of the VSYNC signals, and the total vertical calculation device 520 calculates the number of rising edges of the HSYNC signals between two adjacent rising edges of VSYNC signals. The vertical synchronization signal generator 540 is coupled to the total vertical calculation device 520 and vertical synchronization active and inactive detector 530. The vertical synchronization signal generator 540 generates the virtual VSYNC signal in fragment domain of the second HDMI port according to the number of rising edges in the HSYNC in the frame and horizontal lines.

In one embodiment, a line has only one rising edge. From the calculation of the rising times of the HDMI synchronization signal in a frame (when the VSYNC rising edge of the next frame is counted, the count will stop). In this way, the number of lines in the vertical direction can be calculated. By detecting the number of vertical lines in the frame, a virtual signal can be generated. This virtual signal is a fixed period.

Figure 5:
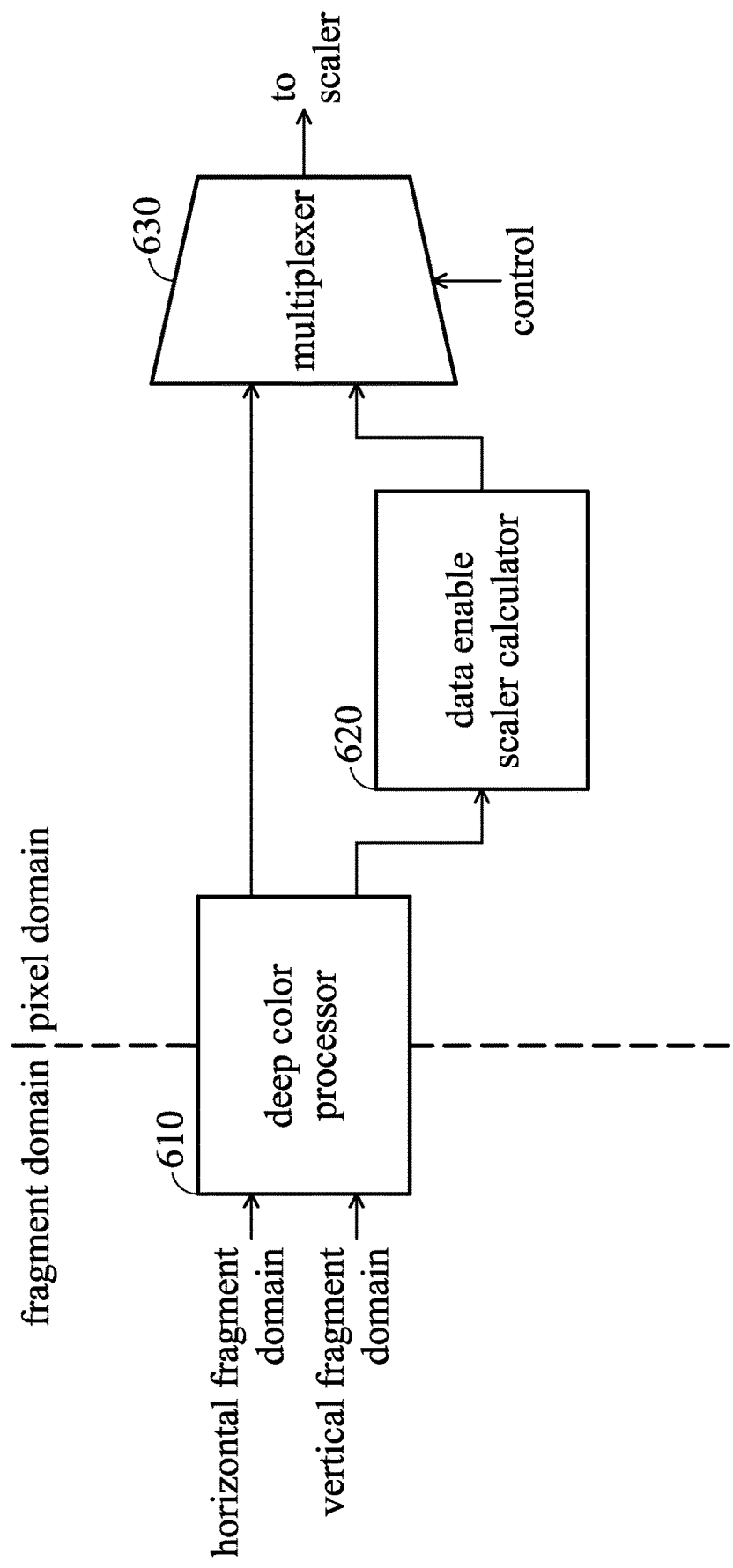
FIG. 5 is a block diagram of the HDMI device according to an embodiment of the invention.

FIG. 5 is a block diagram of the HDMI device according to an embodiment of the invention. In fragment domain, the virtual HSYNC in fragment domain and the virtual VSYNC in fragment domain are inputted into a deep color processor 610.

In one embodiment, when the power mode signal to the multiplexer 630 is a normal power mode signal, the deep color processor 610 receives the horizontal fragment domain and the vertical fragment domain of the first HDMI input. It then transmits video data from the first HDMI input (which was initially enabled for displaying), the horizontal fragment domain, the vertical fragment domain of the first HDMI input, and the video data to the multiplexer 630, in order to display the video data from the first HDMI input.

In one embodiment, when the power mode signal to the multiplexer 630 is a power-saving mode signal, the deep color processor 610 receives the virtual horizontal fragment domain and the virtual vertical fragment domain of the second HDMI input, which are generated by the vertical and horizontal synchronization generators. The deep color processor 610 then converts the virtual horizontal fragment domain and the virtual vertical fragment domain into a virtual HSYNC signal and a virtual VSYNC signal and transmits virtual HSYNC and VSYNC signals of the second HDMI input to a data enable scale calculator 620. The data enable scale calculator 620 generates a DE signal and transmit DE signal with the virtual HSYNC and VSYNC signals to the multiplexer 630.

In one embodiment, the multiplexer 630 is configured to control selecting normal power mode or power-saving mode.

In one embodiment, the horizontal fragment domain is a sawtooth domain (the input of the data enable scale calculator 620 is a sawtooth timing, and the output of the data enable scale calculator 620 is also a virtual and sawtooth domain).

In one embodiment, in the normal power mode, the deep color processor 610 directly transmits the horizontal fragment domain, the vertical fragment domain and video data to the multiplexer 630. If the multiplexer 630 detects that at least one of the signals of the domains is unstable, the reset mode is entered. In one embodiment, in the power-saving mode, the length of the virtual signal will change, because the data is not visible after the power is turned off. The horizontal fragment domain, the vertical fragment domain and video data are calculated (these domains can be regarded as the virtual horizontal fragment domain, the vertical fragment domain, and the virtual video data) through the data enable scale calculator 620. The backend will regard the signals as normal, so that the power-saving mode works normally.

In one embodiment, a virtual HSYNC signal and a virtual VSYNC signal can be generated by the horizontal synchronization generator 330 and the vertical synchronization signal generator 540. In the way of simulating a virtual signal, the synchronization signal, the square timing, is derived by the equation mentioned above, and transmitted to the backend. Meanwhile, the virtual signals can be used for powering on the initially disabled HDMI port for a predetermined period so that the encrypted information from a source device could be obtained. In the present embodiment, the encrypted information is the HDCP information. By obtaining the updated HDCP information, and generating virtual HSYNC, virtual VSYNC, and DE signals in this embodiment, the initially disabled HDMI port can be enabled to transmit video data and the video can be displayed very rapidly when the normal power mode signal is transmitted.

Figure 6:
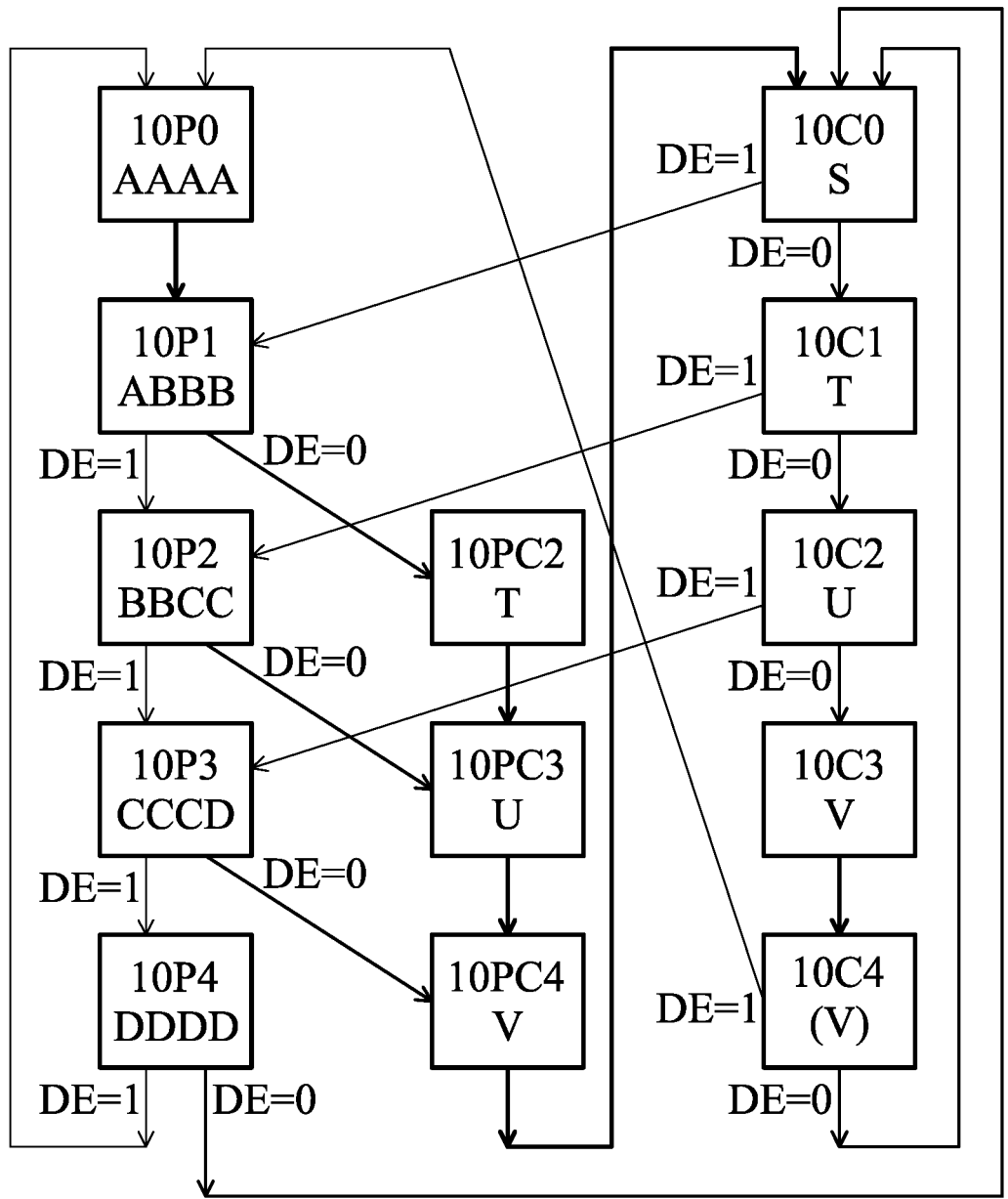
FIG. 6 is a schematic diagram of processing the 30-bit deep color mode according to an embodiment of the invention.

FIG. 6 is a schematic diagram of processing the 30-bit deep color mode according to an embodiment of the invention. In FIG. 6, when 30-bit deep color mode is applied, 10 bits data for each channel of the second HDMI port would be processed for each pixel. Each fragment (i.e., 10P0-10P4, 10C0-10C4, 10PC2-10PC4) can deal with 8 bits. Each capital letter A-D represents 2 bits. Each capital letter S-V and (V) represents 8 bits.

Figure 7:
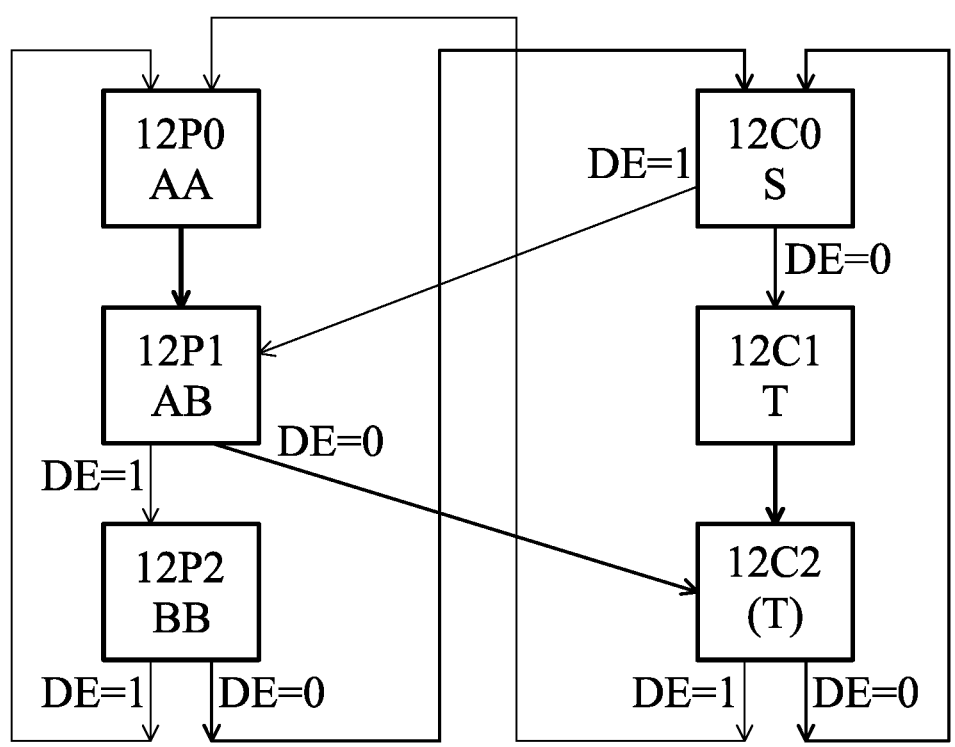
FIG. 7 is a schematic diagram of processing the 36-bit deep color mode according to an embodiment of the invention.

FIG. 7 is a schematic diagram of processing the 36-bit deep color mode according to an embodiment of the invention. In FIG. 7, when 36-bit deep color mode is applied, 12 bits data for each channel of the second HDMI port would be processed for each pixel. Each fragment (i.e., 12P0-12P2, 12C0-12C2) can deal with 8 bits. Each capital letter A-B represents 4 bits. Each capital letter S-T and (T) represents 8 bits.

With the reference to FIG. 2, in one embodiment, when 36-bit deep color mode is applied, 12 bits data for each channel of the second HDMI port would be processed for each pixel. The total horizontal calculation device 320 calculates the number of pixels of a horizontal line in a picture frame, h_total_for_1_line, by the equation:

$$\text{h}_{total\ for\ 1\ line} = \text{N}_{fragments\ for\ 2\ lines} / 3$$

$N_{fragments\ for\ 2\ lines}$ indicates the number of fragments to be transmitted for two horizontal lines in the picture frame.

Subsequently, the number of pixels of a horizontal line in the picture frame, h_total_for_1_line, can be presented as 2k+i. The notation k is a positive integer, the notation i is the remainder positive integer between 0 and 1. For example, if there are 1875 pixels in one horizontal line. h_total_for_1_line=4k+i, wherein k=937 and i=1.

With the value of "k" and "i", the horizontal length, $L_p$, for each line (as shown in FIG. 3) can be calculated by the follow equation:

$$L_p = 3k + \left\lfloor \frac{3}{2} i \cdot p \right\rfloor - \left\lfloor \frac{3}{2} i \cdot (p-1) \right\rfloor$$

The notation $L_p$ can represent the horizontal length by fragment. That is, $L_p$ indicates the number of fragments of each horizontal line in the picture frame. To be clear, the number of fragments could be different for each line in the picture frame. The notation p indicates the index of line. According to the values of k and i, which are derived from the number of pixels of a horizontal line in the picture frame, and the floor function equation, the horizontal length by fragment can be obtained. Taking 1875 pixels in one horizontal line for example, the value of k is 937 and the value of i is 1. The number of fragment of the first line, $L_1$ is 3*937+[3/2*1*1]−[3/2*1*(1−1)]=3*937+1. The number of fragment of the second line, $L_2$ is 3*937+[3/2*1*2]−[3/2*1*(2−1)]=3*937+1=3*937+2. The number of fragment of the m-th line, $L_m$ is 3*937+[3/2*1*m]−[3/2*1*(m−1)]. Accordingly, the number of fragments of each line of the picture frame can be obtained.

According to the initial HDMI synchronization active timing and the horizontal length $L_p$, the subsequent synchronization active timings can be predicted, and the virtual HSYNC can be generated.

Figure 8:
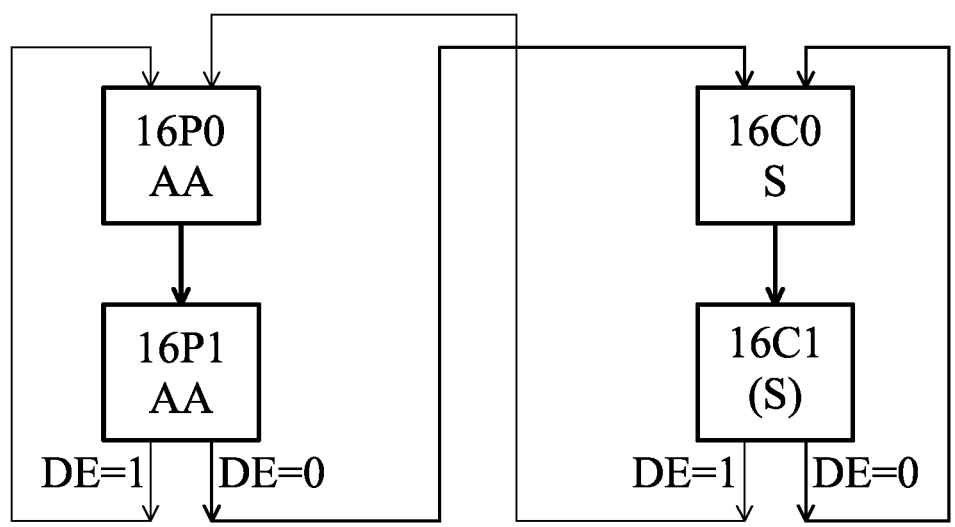
FIG. 8 is a schematic diagram of processing the 48-bit deep color mode according to an embodiment of the invention.

FIG. 8 is a schematic diagram of processing the 48-bit deep color mode according to an embodiment of the invention. In FIG. 8, when 48-bit deep color mode is applied, 16 bits data for each channel of the second HDMI port would be processed for each pixel. Each fragment (i.e., 16P0-12P1, 16C0-12C1) can deal with 8 bits. Each capital letter "A" represents 4 bits. Each capital letter S and (S) represents 8 bits.

With the reference to FIG. 2, in one embodiment, when 48-bit deep color mode is applied, 19 bits data for each channel of the second HDMI port would be processed for each pixel. The total horizontal calculation device 320 calculates the number of pixels of a horizontal line in a picture frame, h_total_for_1_line, by the equation:

$$\text{h}_{total\ for\ 1\ line} = \text{N}_{fragments\ for\ 1\ line} / 2$$

$N_{fragments\ for\ 1\ line}$ indicates the number of fragments to be transmitted for one horizontal lines in the picture frame.

Subsequently, the number of pixels of a horizontal line in the picture frame, h_total_for_1_line, can be presented as k. The notation k is a positive integer. For example, if there are 1875 pixels in one horizontal line. h_total_for_1_line=k, wherein k=1875.

With the value of "k" and, the horizontal length, $L_p$, for each line (as shown in FIG. 3) can be calculated by the follow equation:

$$L_p = 2k$$

The notation $L_p$ can represent the horizontal length by fragment. That is, $L_p$ indicates the number of fragments of each horizontal line in the picture frame. The notation p indicates the index of line. According to the values of k, which are derived from the number of pixels of a horizontal line in the picture frame, the horizontal length can be obtained. Taking 1875 pixels in one horizontal line for example, the value of k is 1875 and the value of i is 1. The number of fragments of the first line, $L_1$ is 2*1875. The number of fragments of the second line, $L_2$ is 2*1875. The number of fragments of the q-th line, $L_q$ is 2*1875. Accordingly, the number of fragments of each line of the picture frame can be obtained.

According to the initial HDMI synchronization active timing and the horizontal length $L_p$, the subsequent synchronization active timings can be predicted, and the virtual HSYNC can be generated.

In the present embodiment, the HDMI sink device comprises a plurality of HDMI ports (e.g., the first HDMI port 111 and the second HDMI port 112 in FIG. 1, but the invention should not be limited thereto) which are coupled to a plurality of HDMI source devices (e.g., a first HDMI source device 171, and a second HDMI source device 172, but the invention should not be limited thereto) respectively. The first HDMI port 111 is operating in the normal power mode to receive the data from the first source device and meanwhile the HDCP information is obtained so that the video data from the first source can be displayed. The second HDMI port 112 is disabled for displaying and operating under the power-saving mode. The disabled HDMI ports are powered on only for obtaining the HDCP information from the corresponding HDMI source device. To achieve this, the VSYNC signal has to be predicted and simulated in the power saving mode.

Figure 9:
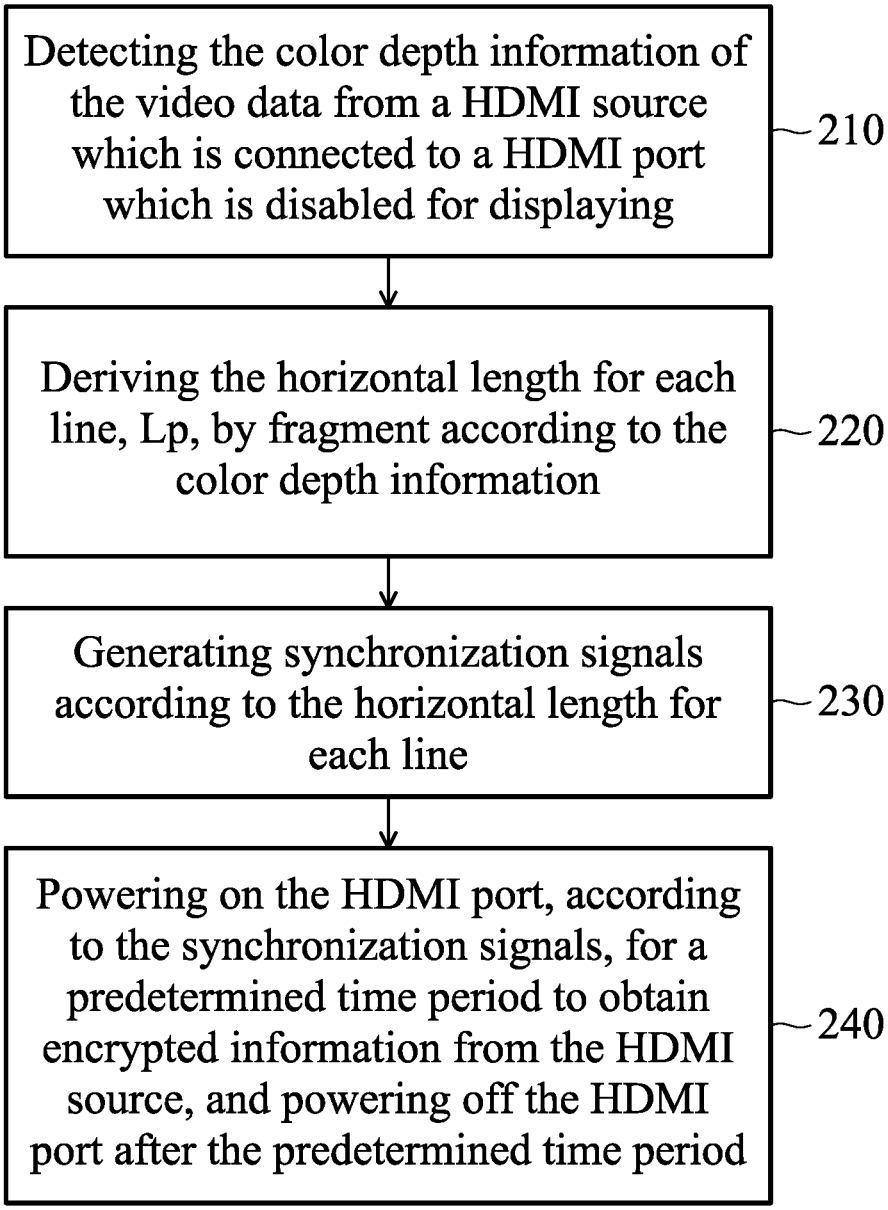
FIG. 9 is a flow chart of a power-saving method for enabling the quick turn-on or rapid HDMI port switch function when the deep color mode is applied..

FIG. 9 is a flow chart to illustrate a power-saving method 200 for enabling the quick turn-on or rapid HDMI port switch function when the deep color mode is applied.

In step 210, detecting the color depth information of the video data from an HDMI source which is connected to an HDMI port which is disabled for displaying.

The color depth information is depending on the video data of the HDMI source. Generally, it's 30-bit color mode, 36-bit color mode or 48-bit color mode when the deep color depth is invoked in video data of the HDMI source.

In step 220, deriving the horizontal length for each line, $L_p$, by fragment according to the color depth information. Taking 30-bit color more as an example, the number of pixels of a horizontal line in a picture frame, h_total_for_1_line, by the equation:

$$h_{total\ for\ 1\ line} = N_{fragments\ for\ 4\ lines} / 5$$

$N_{fragments\ for\ 4\ lines}$ indicates the number of fragments to be transmitted for four horizontal lines in the picture frame.

Subsequently, the number of pixels of a horizontal line in the picture frame, h_total_for_1_line, can be presented as 4k+i. The notation k is a positive integer, the notation i is the remainder positive integer between 0 and 3. For example, if there are 1875 pixels in one horizontal line. h_total_for_1_line=4k+i, wherein k=468 and i=3.

With the value of "k" and "i", the horizontal length, $L_p$, for each line (as shown in FIG. 3) can be calculated by the follow equation:

$$L_p = 5k + \left\lfloor \frac{5}{4} i \cdot p \right\rfloor - \left\lfloor \frac{5}{4} i \cdot (p-1) \right\rfloor$$

The notation $L_p$ can represent the horizontal length by fragment. That is, $L_p$ indicates the number of fragments of each horizontal line in the picture frame. To be clear, the number of fragments could be different for each line in the picture frame. The notation p indicates the index of line. According to the values of k and i, which are derived from the number of pixels of a horizontal line in the picture frame, and the floor function equation, the horizontal length by fragment can be obtained. Taking 1875 pixels in one horizontal line for example, the value of k is 468 and the value of i is 3. The number of fragment of the first line, $L_1$ is 5*468+[5/4*3*1]−[5/4*3*(1−1)]=5*468+3. The number of fragment of the second line, $L_2$ is 5*468+[5/4*3*2]−[5/4*3*(2−1)]=5*468+4. The number of fragment of the n-th line, $L_n$ is 5*468+[5/4*3*n]−[5/4*3*(n−1)]. Accordingly, the number of fragments of each line of the picture frame can be obtained.

Regarding the derivation details of 36-bit color mode and 48-bit color mode are described in the previous paragraphs and will not be repeated here.

In step 230, generating synchronization signals according to the horizontal length for each line, $L_p$.

The horizontal length $L_p$ is the fragment amount between two HSYNC signals of the adjacent horizontal lines. With the initial HSYNC and the horizontal length $L_p$, the timing of the subsequent HSYNC signals can be predicted and the subsequent HSYNC signals can be generated accordingly.

Once the HSYNC signals can be predicted and generated, the VSYNC signals can be generated by the information of number of horizontal lines in the picture frame and counting of the HSYNC signals.

In step 240, powering on the HDMI port, according to the synchronization signals, for a predetermined time period to obtain encrypted information from the HDMI source, and powering off the HDMI port after the predetermined time period. In one embodiment, the encrypted information is HDCP information.

Usually, HDCP information is located on a specific location related the HSYNC and VSYNC signals in the picture frame. Once the HSYNC and VSYNC signals can be simulated, the HDMI port can be powering on for a predetermined time period to obtain the HDCP information from HDMI source and powering off once the HDCP information is secured. Based on this embodiment, the HDCP information of each picture frame of video data can be obtained by HDMI sink. If the user would like to switch to display the video data which is connected to the HDMI port being disabled in the beginning, the video data can be display in very short time without the penalty of HDCP information loss.

The power-saving method for enabling the quick turn-on or rapid HDMI port switch function when the deep color mode is applied of the invention providing a mechanism to immediately switch ports. In the power-saving mode, the HDMI synchronization signal generator calculates and transmits the virtual fragment domains and generates the enable data to the backend, so that the backend regards it works in the normal power mode, so as to achieve fast switching between the power-saving mode and the normal power mode. Therefore, the power-saving mode can be implemented, and power consumption can be reduced. Furthermore, when the user switches from one HDMI port to another, the user can immediately see the video data without having to wait for re-authentication.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A power-saving method for an HDMI device, the HDMI device having an HDMI port being disabled for displaying, the method comprising:
    detecting color depth information of video data from an HDMI source which is connected to the HDMI port;
    deriving a horizontal length for each line by fragment of a picture frame according to the color depth information;
    generating a plurality of synchronization signals according to the horizontal length for each line by fragment; and
    powering on the HDMI port, according to the synchronization signals, for a predetermined time period to obtain encrypted information from the HDMI source, and powering off the HDMI port after the predetermined time period.

2. The power-saving method of claim 1, wherein deriving a horizontal length for each line by fragment comprises converting the number of pixels for each line of the picture frame into the number of fragments for each line of the picture frame according to the color depth information.

3. The power-saving method of claim 1, wherein when the color depth information is 30-bit deep color mode, the number of pixels for each line is represented by 4k+i, wherein the notation k is a positive integer, and the notation i is the integer between 0 and 3; and
    the horizontal length for each line by fragment, $L_p$, is derived by the follow equation:

$$L_p = 5k + \left\lfloor \frac{5}{4} i \cdot p \right\rfloor - \left\lfloor \frac{5}{4} i \cdot (p-1) \right\rfloor$$

wherein the notation p represents the line index.

4. The power-saving method of claim 1, wherein when the color depth information is 36-bit deep color mode, the number of pixels for each line is represented by 2k+i, wherein the notation k is a positive integer; and
    the horizontal length for each line by fragment, $L_p$, is derived by the follow equation:

$$L_p = 3k + \left\lfloor \frac{3}{2} i \cdot p \right\rfloor - \left\lfloor \frac{3}{2} i \cdot (p-1) \right\rfloor$$

wherein the notation p represents the line index and the notation i is the integer between 0 and 1.

5. The power-saving method of claim 1, wherein when the color depth information is 48-bit deep color mode, the number of pixels for each line is represented by 2k, wherein the notation k is a positive integer; and
    the horizontal length for each line by fragment, $L_p$, is derived by the follow equation:

$L_p = 2k$ wherein the notation p represents the line index.

6. The power-saving method of claim 1, wherein a virtual horizontal synchronization signal (HSYNC) of the HDMI port is generated according to the horizontal length of each line by fragment of the picture frame.

7. The power-saving method of claim 6, wherein a vertical synchronization signal (VSYNC) of the HDMI port is generated by calculating a number of the HSYNC of the picture frame.

8. A High Definition Multimedia Interface (HDMI) device, comprising:
    an HDMI interface, comprising a plurality of HDMI ports, wherein the plurality of HDMI ports comprise a first HDMI port initially enabled for displaying;
    a second HDMI port disabled for displaying;
    an HDMI synchronization signal generator, coupled to the HDMI interface, wherein the HDMI synchronization signal generator provides a synchronization signal according to data from an HDMI source coupled to the second HDMI port; and
    a power mode controller, coupled to the HDMI interface, a multiplexer, and the HDMI synchronization signal generator, wherein the power mode controller is configured to transmit a power mode signal to the multiplexer;

wherein a display device is coupled to the power mode controller, and the display device displays video data based on the power mode signal received by the multiplexer.

9. The HDMI device as claimed in claim 8, wherein when the multiplexer receives the power mode signal that is a normal power mode signal, the video data from an HDMI Media Access Control (MAC) layer is selected to be displayed.

10. The HDMI device as claimed in claim 8, wherein when the multiplexer receives the power mode signal that is a power-saving mode signal, the synchronization signal from the HDMI synchronization signal generator is transmitted.

11. The HDMI device as claimed in claim 8, wherein the HDMI synchronization signal generator comprises:
a total horizontal calculation device; and
a horizontal synchronization detector, configured to detect HDMI synchronization timings and to transmit the HDMI synchronization timings to the total horizontal calculation device;
wherein the total horizontal calculation device is coupled to the horizontal synchronization detector to receive the HDMI synchronization timings and is configured to derive a horizontal length of each line by fragment of a picture frame.

12. The HDMI device as claimed in claim 11, wherein the HDMI synchronization signal generator further comprises:
a horizontal synchronization generator, coupled to the horizontal synchronization detector and the total horizontal calculation device, wherein the horizontal synchronization generator generates a horizontal synchronization signal (HSYNC) of the second HDMI port according to the horizontal length of each line.

13. The HDMI device as claimed in claim 12, wherein the HDMI synchronization signal generator further comprises:
a horizontal synchronization active detector, configured to detect the HSYNC for each line of the picture frame; and
a total vertical calculation device, coupled to the horizontal synchronization active detector, to obtain the number of horizontal lines of the picture frame.

14. The HDMI device as claimed in claim 13, wherein the HDMI synchronization signal generator further comprises:
a vertical synchronization detector, coupled to the total vertical calculation device, for detecting vertical synchronization signals (VSYNC); and
a vertical synchronization signal generator, coupled to the total vertical calculation device and vertical synchronization detector, for providing VSYNC according to the number of vertical lines in the picture frame.

15. The HDMI device as claimed in claim 8, wherein when the power mode signal to the multiplexer is a normal power mode signal, a deep color processor receives a horizontal fragment domain and a vertical fragment domain of the first HDMI port and transmits video data from the first HDMI port initially enabled for displaying, the horizontal fragment domain and the vertical fragment domain of the first HDMI port and the video data to the multiplexer, to display the video data from the first HDMI port.

16. The HDMI device as claimed in claim 8, wherein when the power mode signal to the multiplexer is a power-saving mode signal, a deep color processor receives a virtual horizontal fragment domain and a virtual vertical fragment domain of the second HDMI port, the virtual horizontal fragment domain and the virtual vertical fragment domain of the second HDMI port are generated by a horizontal synchronization generator and a vertical synchronization generator respectively, the deep color processor then converts the virtual horizontal fragment domain and the virtual vertical fragment domain into a virtual HSYNC signal and a virtual VSYNC signal and transmits the virtual HSYNC and a plurality of VSYNC signals of the second HDMI port to a data enable scale calculator, and the data enable scale calculator generates a data enable signal and transmits the data enable signal with the virtual HSYNC and the VSYNC signals to the multiplexer.

* * * * *